(12) United States Patent
Obotnine

(10) Patent No.: US 11,410,405 B2
(45) Date of Patent: *Aug. 9, 2022

(54) IMAGING-BASED SENSOR CALIBRATION

(71) Applicant: SYMBOL TECHNOLOGIES, LLC, Lincolnshire, IL (US)

(72) Inventor: Alexandre Obotnine, North York (CA)

(73) Assignee: Symbol Technologies, LLC, Holtsville, NY (US)

( * ) Notice: Subject to any disclaimer, the term of this patent is extended or adjusted under 35 U.S.C. 154(b) by 89 days.

This patent is subject to a terminal disclaimer.

(21) Appl. No.: 15/912,073

(22) Filed: Mar. 5, 2018

(65) Prior Publication Data

US 2019/0073550 A1 Mar. 7, 2019

Related U.S. Application Data

(63) Continuation of application No. 15/698,316, filed on Sep. 7, 2017, now Pat. No. 9,940,535.

(51) Int. Cl.
| | |
|---|---|
| *G06V 10/147* | (2022.01) |
| *B25J 9/16* | (2006.01) |
| *G06V 10/22* | (2022.01) |
| *H04N 5/365* | (2011.01) |
| *G06T 7/80* | (2017.01) |
| *G06V 10/10* | (2022.01) |
| *G06V 10/26* | (2022.01) |
| *H04N 1/00* | (2006.01) |

(52) U.S. Cl.
CPC .......... *G06V 10/147* (2022.01); *B25J 9/1697* (2013.01); *G06T 7/80* (2017.01); *G06V 10/17* (2022.01); *G06V 10/22* (2022.01); *G06V 10/26* (2022.01); *H04N 5/3656* (2013.01); *G06T 2207/10016* (2013.01); *G06T 2207/10028* (2013.01); *G06T 2207/20076* (2013.01); *G06T 2207/30244* (2013.01); *G06T 2207/30252* (2013.01); *H04N 1/00307* (2013.01)

(58) Field of Classification Search
CPC ............. G06T 7/80; G06T 2207/10016; G06T 2207/10028; G06T 2207/20076; G06T 2207/30244; G06T 2207/30252; B25J 9/1697; G06K 9/2054; G06K 9/209; G06K 9/22; G06K 9/34; G06K 19/06009; H04N 1/00307; H04N 5/3656
See application file for complete search history.

(56) References Cited

U.S. PATENT DOCUMENTS

| | | | |
|---|---|---|---|
| 5,260,556 A | * 11/1993 | Lake | ................ G06K 19/06037 235/494 |
| 5,520,769 A | * 5/1996 | Barrett | .................... H01L 22/12 977/854 |
| 9,639,935 B1 | 5/2017 | Douady-Pleven et al. | |

(Continued)

*Primary Examiner* — Violeta A Prieto

(57) ABSTRACT

A sensor calibration target configured for sensor calibration relative to a common frame of reference is disclosed. The sensor calibration target comprises a first surface at a first predefined depth bearing a first set of indicia at respective first heights and having respective first predefined shifts, each of the first indicia encoding a corresponding first height. The sensor calibration target further comprises a second surface at a second predefined depth bearing a second set of indicia at respective second heights and having respective second predefined shifts, each of the second indicia encoding a corresponding second height.

9 Claims, 12 Drawing Sheets

(56) References Cited

U.S. PATENT DOCUMENTS

| | | | |
|---|---|---|---|
| 9,805,294 B2* | 10/2017 | Liu | G06T 7/60 |
| 9,940,535 B1* | 4/2018 | Obotnine | G06T 7/80 |
| 9,953,420 B2* | 4/2018 | Wolski | G01B 11/0608 |
| 10,289,990 B2* | 5/2019 | Rizzolo | G06Q 20/201 |
| 2004/0021313 A1* | 2/2004 | Gardner | A01K 11/001 |
| | | | 283/81 |
| 2007/0075997 A1* | 4/2007 | Rohaly | G06T 7/85 |
| | | | 345/419 |
| 2012/0069051 A1* | 3/2012 | Hagbi | G06T 19/006 |
| | | | 345/633 |
| 2012/0268579 A1* | 10/2012 | Zhao | G01D 15/00 |
| | | | 348/65 |
| 2014/0247354 A1* | 9/2014 | Knudsen | B60R 1/00 |
| | | | 348/148 |
| 2015/0279035 A1* | 10/2015 | Wolski | G01B 11/0608 |
| | | | 348/148 |
| 2015/0365660 A1* | 12/2015 | Wu | G05D 1/0234 |
| | | | 348/158 |
| 2016/0026253 A1 | 1/2016 | Bradski et al. | |
| 2016/0191759 A1 | 6/2016 | Somanath et al. | |
| 2017/0132836 A1* | 5/2017 | Iverson | G06T 17/10 |
| 2017/0270654 A1* | 9/2017 | Eldar | G06T 7/80 |
| 2018/0082486 A1* | 3/2018 | Hagbi | G06T 19/006 |
| 2018/0107999 A1* | 4/2018 | Rizzolo | H04N 5/247 |
| 2021/0323086 A1* | 10/2021 | Kanko | B23K 26/032 |

* cited by examiner

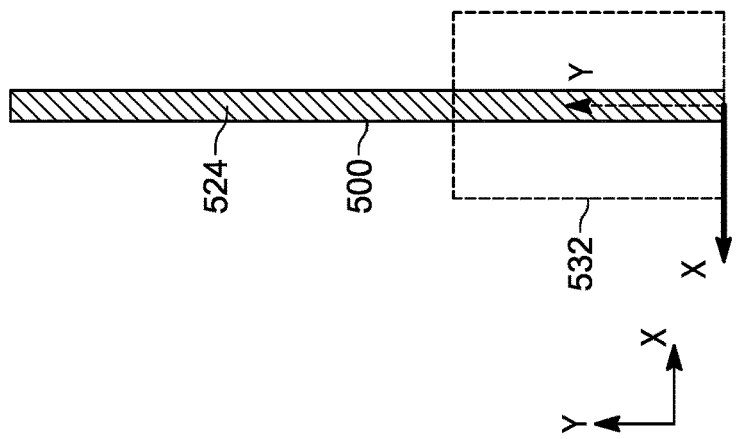
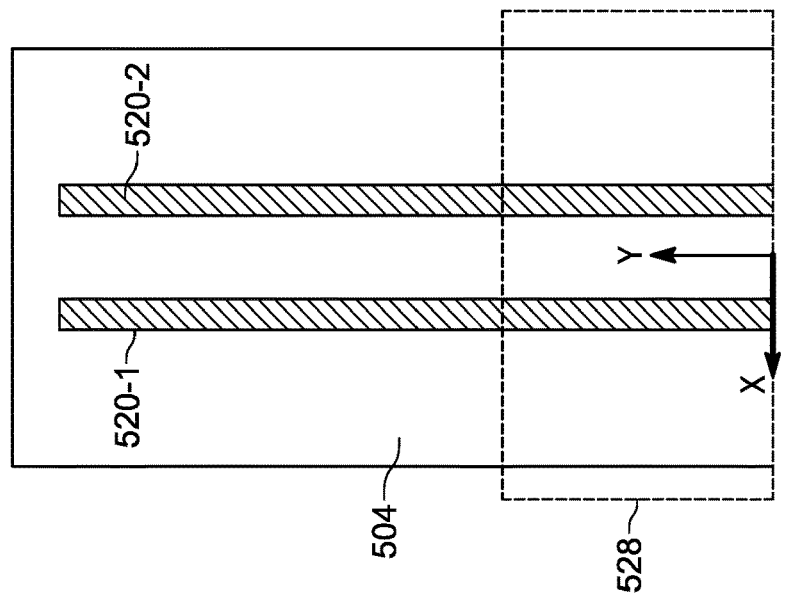
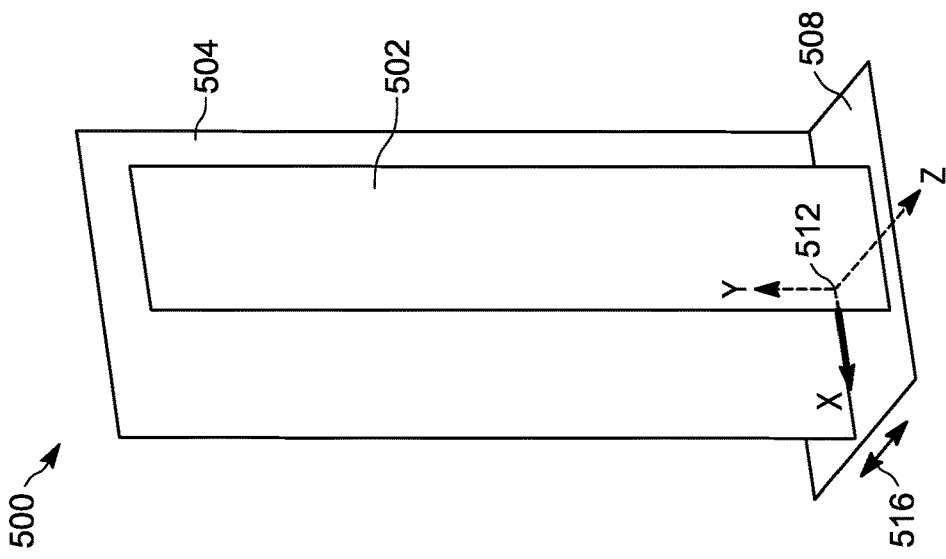
FIG. 5C
FIG. 5B
FIG. 5A

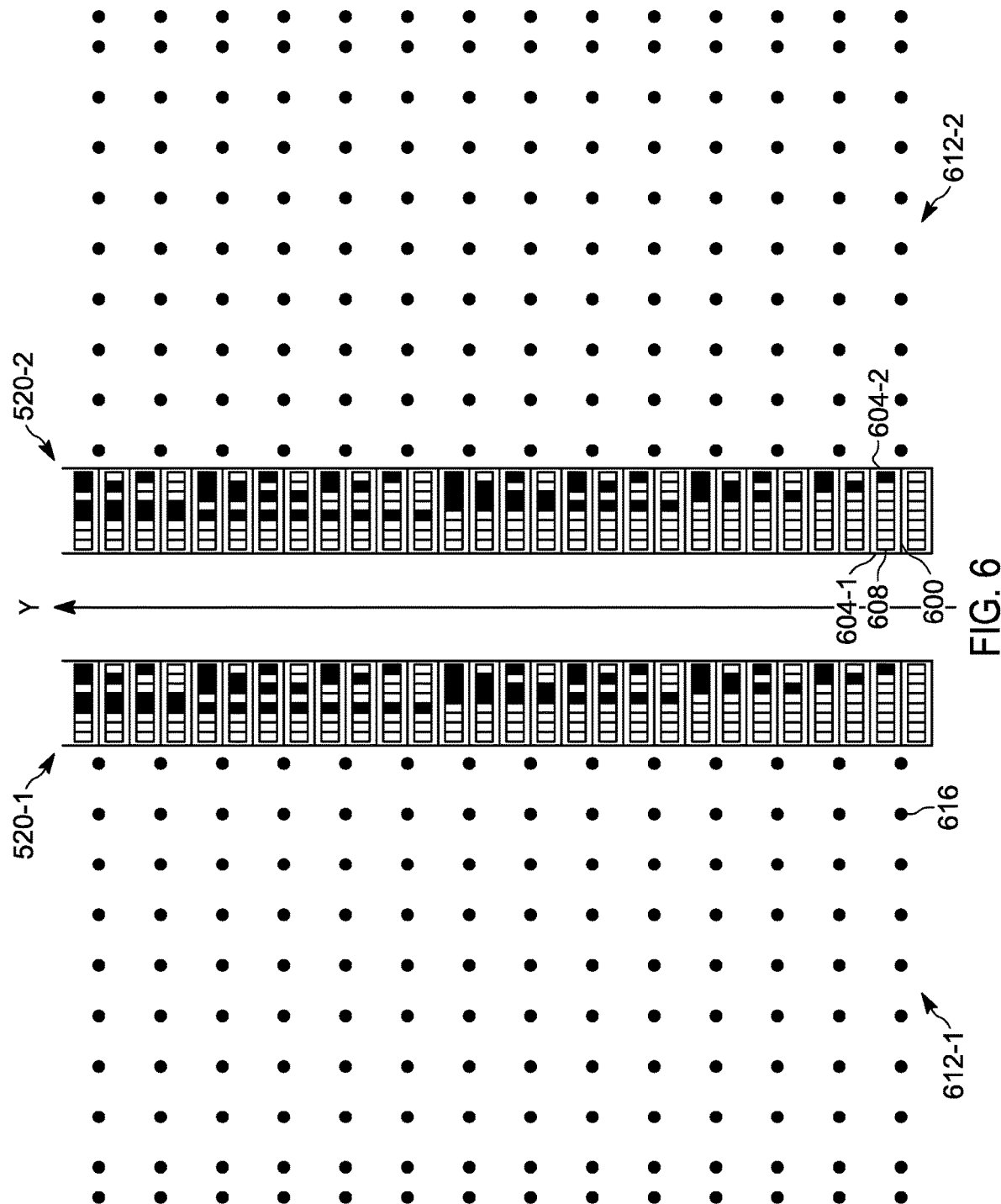

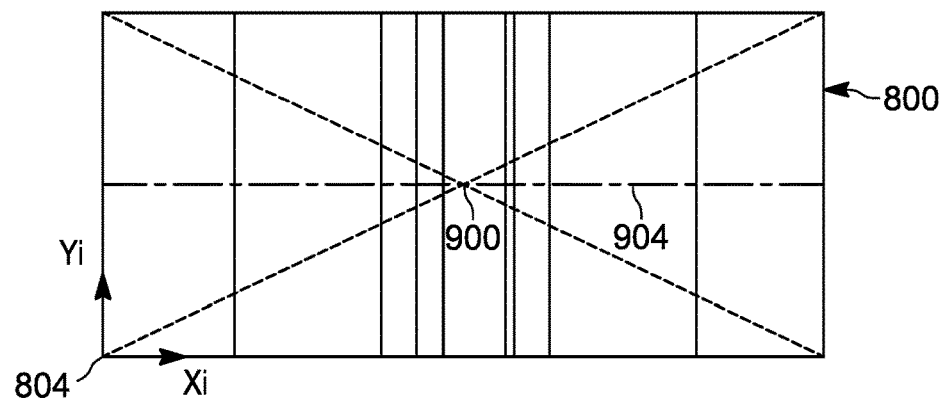
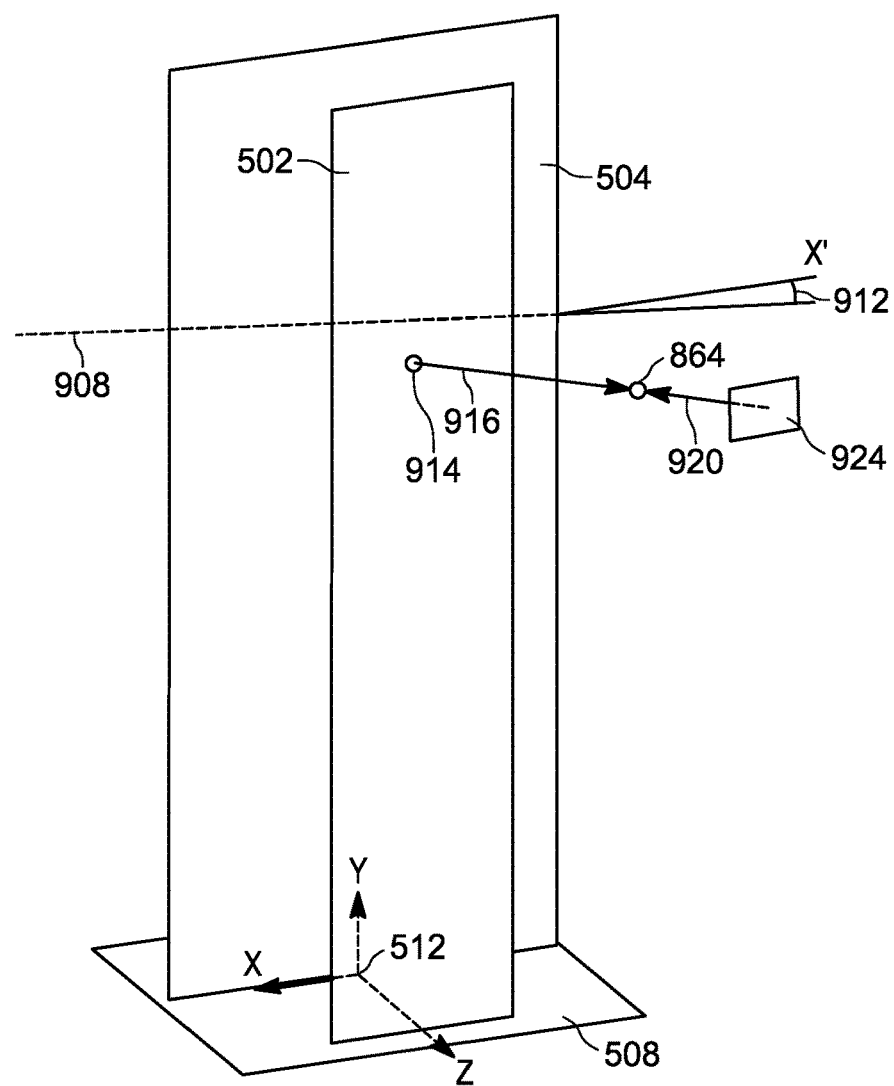
FIG. 9

US 11,410,405 B2

IMAGING-BASED SENSOR CALIBRATION

CROSS-REFERENCE TO RELATED APPLICATIONS

This application is a continuation of U.S. patent application Ser. No. 15/698,316, filed Sep. 7, 2017, entitled "Imaging-Based Sensor Calibration," which is incorporated herein by reference in its entirety.

BACKGROUND

Environments in which objects are managed, such as retail facilities, may be complex and fluid. Tracking the status of objects within such environments may therefore be time-consuming and error-prone when performed by human staff. A mobile apparatus may be deployed to capture data for use in tracking status (e.g., identifying products that are out of stock, incorrectly located, and the like). Such an apparatus may be equipped with a camera to capture images of the environment. However, discovering which locations in the environment correspond to the images captured by the apparatus may require the performance of time-consuming calibration procedures.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 5A-5C depict a calibration target employed in the performance of the method of FIG. 4.

FIG. 6 is a detailed view of a portion of a second surface of the calibration target of FIG. 5.

FIG. 9 illustrates the performance of block 440 of the method of FIG. 4.

Figure 1:
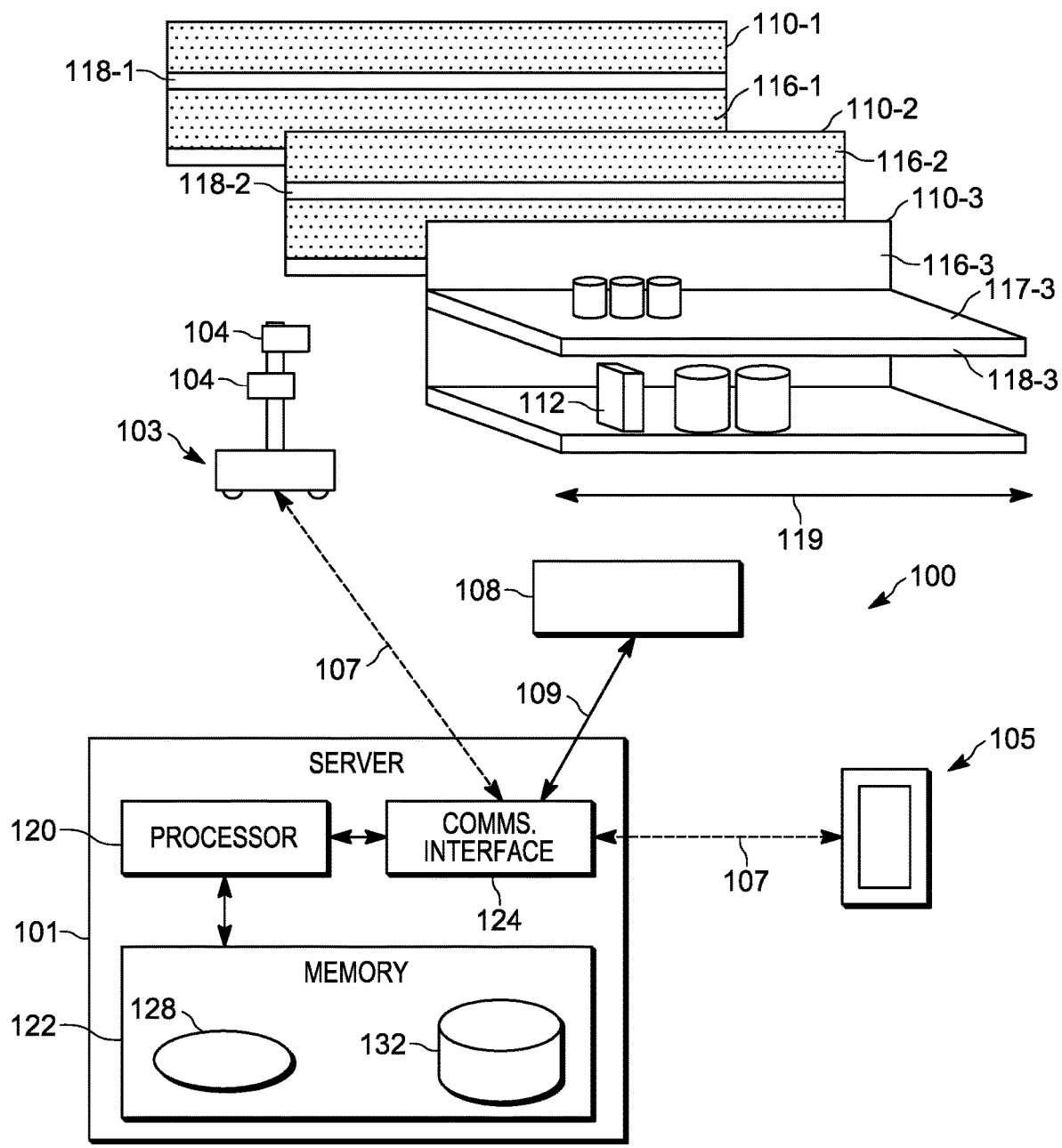
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of sensor calibration relative to a common frame of reference having orthogonal depth, height and shift dimensions, by an imaging controller. The method includes obtaining, via a camera mounted on a mobile automation apparatus, an image of a calibration target associated with a location of the mobile automation apparatus in the common frame of reference. The calibration target includes: a first surface at a first predefined depth bearing a first set of indicia at respective first heights and having respective first predefined shifts, each of the first indicia encoding the corresponding first height; and a second surface at a second predefined depth bearing a second set of indicia at respective second heights and having respective second predefined shifts, each of the second indicia encoding the corresponding second height. The method further includes decoding, by the imaging controller, the first and second heights from the indicia of the first and second sets; generating, by the imaging controller, a first transform between the image frame of reference and a first plane at the first predefined depth in the common frame of reference, and a second transform between the image frame of reference and a second plane at the second predefined depth in the common frame of reference; applying, by the imaging controller, the first and second transforms to each of a plurality of calibration pixels selected from the image to generate, for each calibration pixel, a position pair including a first calibration position on the first plane and a second calibration position on the second plane; determining, by the imaging controller, a camera position in the common frame of reference from an intersection of calibration lines defined by the position pairs; and storing the camera position in association with the location, for mapping of subsequent images captured at subsequent mobile automation apparatus locations to the common frame of reference.

Further examples disclosed herein are directed to an imaging controller for calibrating a sensor relative to a common frame of reference having orthogonal depth, height and shift dimensions, the imaging controller comprising: a data capture controller configured to obtain, via a camera mounted on a mobile automation apparatus, an image of a calibration target associated with a location of the mobile automation apparatus in the common frame of reference; the calibration target including: a first surface at a first predefined depth bearing a first set of indicia at respective first heights and having respective first predefined shifts, each of the first indicia encoding the corresponding first height; and a second surface at a second predefined depth bearing a second set of indicia at respective second heights and having respective second predefined shifts, each of the second indicia encoding the corresponding second height; a decoder configured to decode the first and second heights from the indicia of the first and second sets; a transform generator configured to generate a first transform between an image frame of reference and a first plane at the first predefined depth in the common frame of reference, and a second transform between the image frame of reference and a second plane at the second predefined depth in the common frame of reference; and a calibrator configured to: apply the first and second transforms to each of a plurality of calibration pixels selected from the image to generate, for each calibration pixel, a position pair including a first calibration position on the first plane and a second calibration position on the second plane; determine a camera position in the common frame of reference from an intersection of calibration lines defined by the position pairs; and store the camera position in association with the location, for mapping of subsequent images captured at subsequent mobile automation apparatus locations to the common frame of reference.

FIG. 1 depicts a mobile automation system 100 in accordance with the teachings of this disclosure. The system 100 includes a control server 101 (also referred to herein simply as the server 101), in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points. In other examples, the server 101, the client device 105, or both, are located outside the retail environment, and the links 107 therefore include wide-area networks such as the Internet, mobile networks, and the like. As will be described in greater detail below, the system 100 also includes a dock 108 for the apparatus 103. The dock 108 is in communication with the server 101 via a link 109 that in the present example is a wired link (e.g., an Ethernet link). In other examples, however, the link 109 is a wireless link. The mobile automation apparatus 103, when coupled to the dock 108, may establish communications with the dock 108 to communicate with the server 101 via the link 109 instead of, or in addition to, the link 107. The dock 108 may also supply power (e.g. electrical power) to the apparatus 103.

The client computing device 105 is illustrated in FIG. 1 as a mobile computing device, such as a tablet, smart phone or the like. In other examples, the client device 105 includes computing devices such as a desktop computer, a laptop computer, another server, a kiosk, a monitor, or other suitable device. The system 100 can include a plurality of client devices 105, each in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3. The shelf modules 110 may also, in some examples, include other support structures, such as pegs, hangers and the like. The shelf modules 110 are typically arranged in a plurality of aisles, each of which includes a plurality of modules aligned end-to-end. In such arrangements, the shelf edges 118 face into the aisles, through which customers in the retail environment, as well as the apparatus 103, may travel.

More specifically, the apparatus 103 is deployed within the retail environment, and communicates with the server 101 (e.g., via the link 107) to navigate, autonomously or partially autonomously, the length 119 of at least a portion of the shelves 110. The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light), and is further configured to employ the sensors to capture shelf data. As will be discussed below in greater detail, the apparatus 103 is further configured to employ the captured data to generate and store calibration parameters for the above-mentioned data capture sensors, defining the positions and orientations of the sensors relative to the apparatus 103.

The server 101 includes a special purpose controller, such as a processor 120, specifically designed to obtain data captured by the mobile automation apparatus 103 for storage in a memory 122 (e.g., in a repository 132 defined in the memory 122). The server 101 is also, in some examples, configured to perform various post-processing activities on captured data, for example to determine product status data (e.g. out of stock or low stock products) and to transmit status notifications to the mobile device 105 responsive to the determination of product status data.

The processor 120 is interconnected with a non-transitory computer readable storage medium, such as the above-mentioned memory 122, having stored thereon computer readable instructions for executing the above-mentioned post-processing activities. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In an embodiment, the processor 120, further includes one or more central processing units (CPUs) and/or graphics processing units (GPUs). In an embodiment, a specially designed integrated circuit, such as a Field Programmable Gate Array (FPGA), is designed to perform the above-mentioned activities, either alternatively or in addition to the controller/processor 120 and memory 122. As will be understood by those skilled in the art, the client device 105 also includes one or more controllers or processors and/or FPGAs, in communication with the controller 120, specifically configured to process (e.g. to display) notifications received from the server 101.

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the control application 128 or subcomponents thereof, the processor 120 is configured to implement functionality such as the above-mentioned post-processing of data captured by the apparatus 103. The processor 120, as configured via the execution of the control application 128, may also be referred to herein as the controller 120. As will now be apparent, some or all of the functionality implemented by the controller 120 described below may also be performed by preconfigured hardware elements (e.g. one or more Application-Specific Integrated Circuits (ASICs)) rather than by execution of the control application 128 by the processor 120.

Figure 2A:
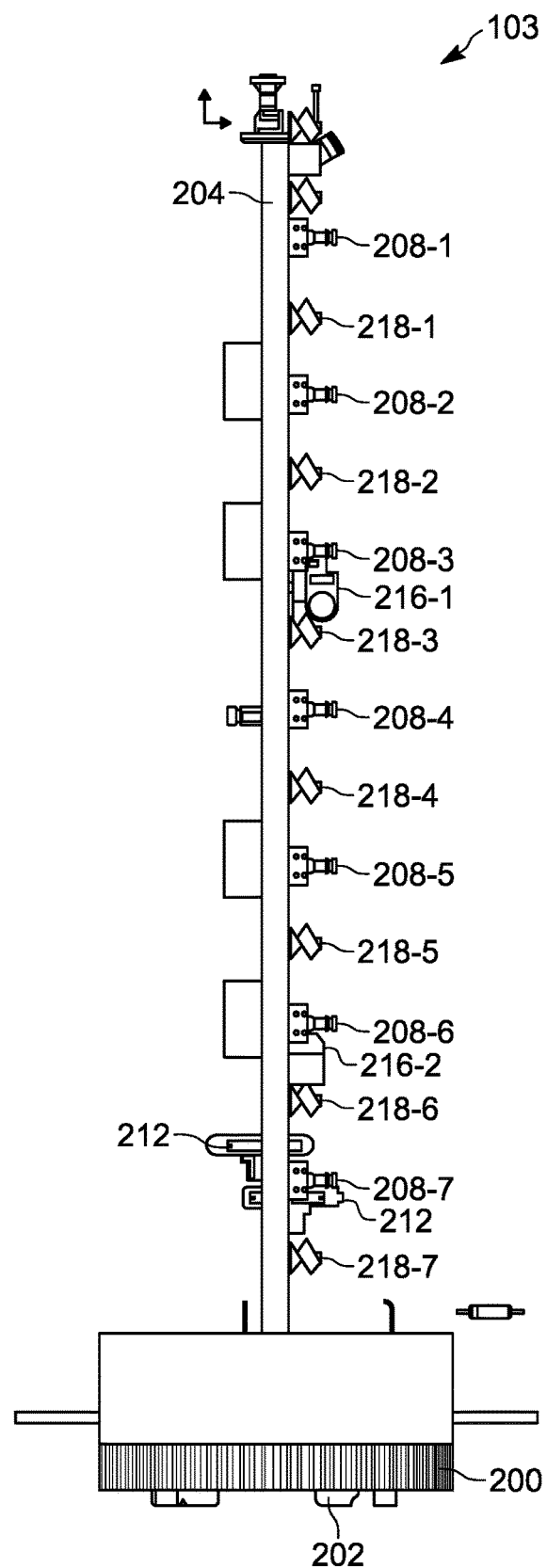
FIG. 2A depicts a mobile automation apparatus in the system of FIG. 1.
Figure 2B:
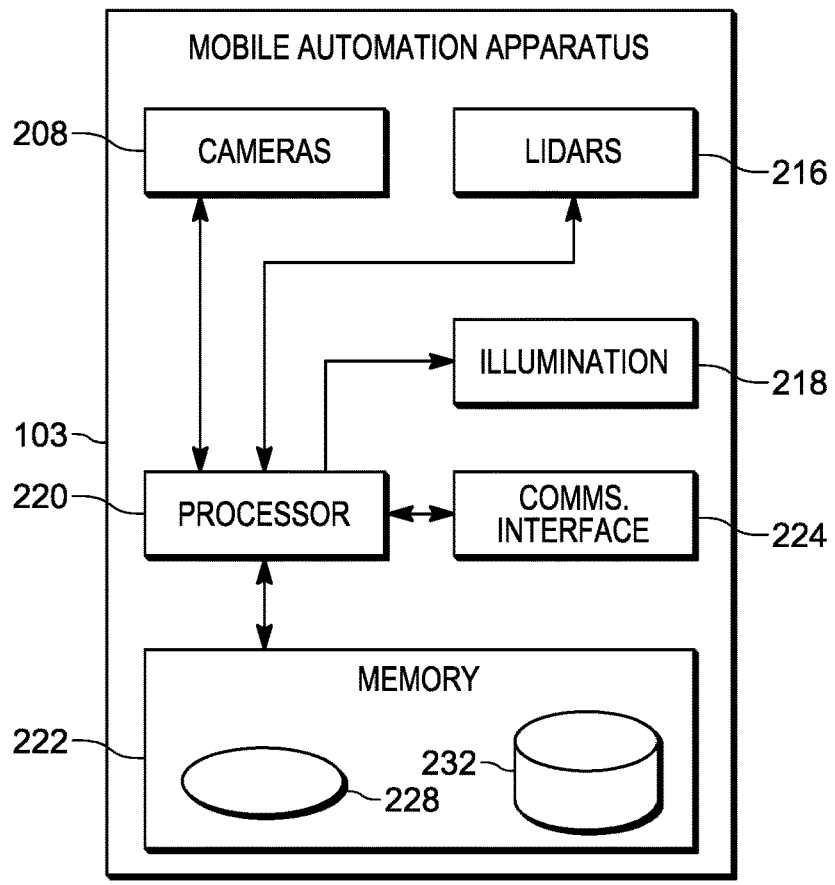
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 200 containing a locomotive mechanism 202 (e.g. one or more electrical motors driving wheels, tracks or the like). The apparatus 103 further includes a sensor mast 204 supported on the chassis 200 and, in the present example, extending upwards (e.g., substantially vertically) from the chassis 200. The mast 204 supports the sensors 104 mentioned earlier. In particular, the sensors 104 include at least one imaging sensor 208, such as a digital camera, as well as at least one depth-sensing sensor 212, such as a 3D digital camera. The apparatus 103 also includes additional depth sensors, such as LIDAR sensors 216. In other examples, the apparatus 103 includes additional sensors, such as one or more RFID readers, temperature sensors, and the like.

In the present example, the mast 204 supports seven digital cameras 208-1 through 208-7, and two LIDAR sensors 216-1 and 216-2. The mast 204 also supports a plurality of illumination assemblies 218, configured to illuminate the fields of view of the respective cameras 208. That is, the illumination assembly 218-1 illuminates the field of view of the camera 208-1, and so on. The sensors 208 and 216 are oriented on the mast 204 such that the fields of view of each sensor face a shelf 110 along the length 119 of which the apparatus 103 is travelling. As will be discussed in greater detail below, the apparatus 103 is configured to track a location of the apparatus 103 (e.g. a location of the center of the chassis 200) in a common frame of reference previously established in the retail facility. The physical arrangement of the sensors 208 and 216 relative to the center of the chassis 200 may not be known, however. To enable the mapping of data captured via the sensors 208 and 216 to the common frame of reference, the apparatus 103 is configured to determine calibration parameters defining the above-mentioned physical arrangement of the sensors 208 and 216.

To that end, the mobile automation apparatus 103 includes a special-purpose controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a control application 228 which, when executed by the processor 220, configures the processor 220 to perform various functions related to the navigation of the apparatus 103 (e.g. by controlling the locomotive mechanism 202) and to the determination of the above-mentioned calibration parameters. The application 228 may also be implemented as a suite of distinct applications in other examples.

The processor 220, when so configured by the execution of the application 228, may also be referred to as a controller 220 or, in the context of determination of the calibration parameters from captured data, as an imaging controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, a map of the environment in which the apparatus 103 operates, for use during the execution of the application 228. The apparatus 103 may communicate with the server 101, for example to receive instructions to initiate data capture operations, via a communications interface 224 over the link 107 shown in FIG. 1. The communications interface 224 also enables the apparatus 103 to communicate with the server 101 via the dock 108 and the link 109.

Figure 3:
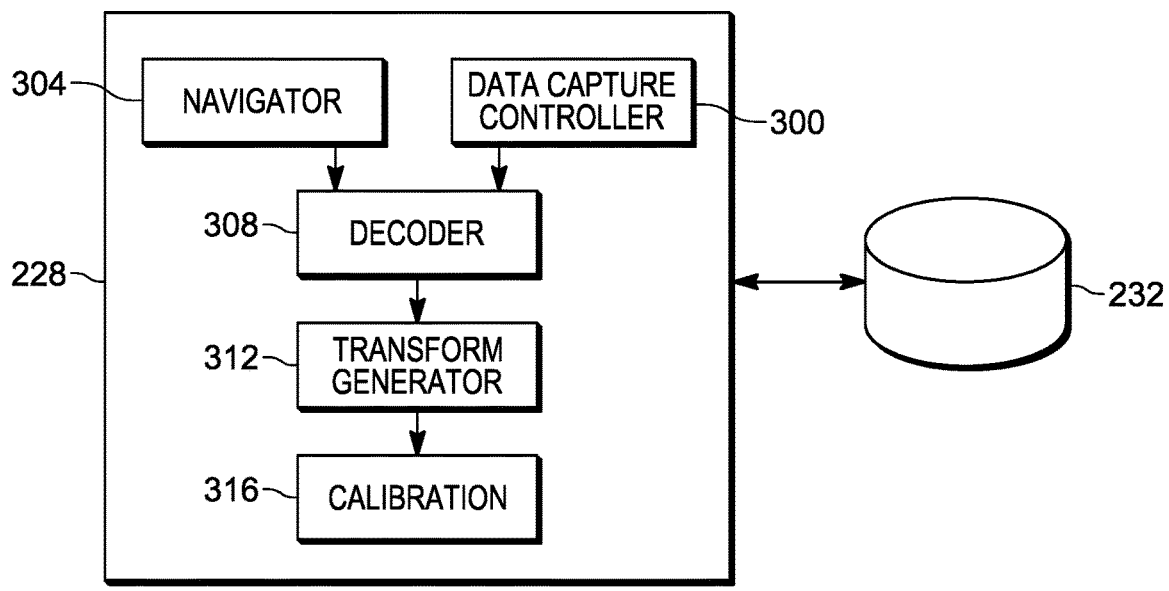
FIG. 3 is a block diagram of certain internal components of the mobile automation apparatus of the system of FIG. 1.

Turning now to FIG. 3, before describing the operation of the application 228 to determine calibration parameters for the sensors 208 and 216, certain components of the application 228 will be described in greater detail. As will be apparent to those skilled in the art, in other examples the components of the application 228 may be separated into distinct applications, or combined into other sets of components. Some or all of the components illustrated in FIG. 3 may also be implemented as dedicated hardware components, such as one or more ASICs or FPGAs.

The application 228 includes a data capture controller 300 configured to control the sensors 208 and 216 to capture data (e.g., digital images and depth measurements, respectively). The application 228 also includes a navigator 304 configured to generate navigation data such as paths through the retail environment and control the locomotive mechanism 202 to travel along the above-mentioned paths. The navigator 304 is also configured to track a location of the apparatus 103 in a common frame of reference established within the retail environment, such as a three-dimensional coordinate system, to be discussed below.

The application 228 further includes a decoder 308 configured to receive captured data from the data capture controller 300 and an associated location from the navigator 304 (i.e., the location of the apparatus 103 at the time the data received from the controller 300 was acquired). The decoder 308 is configured to identify and decode various indicia in the captured data, as will be discussed in further detail below. The application 228 also includes a transform generator 312 configured to generate transforms between the above-mentioned common frame of reference and an image frame of reference in the form of pixel coordinates in the images captured by the cameras 208. Still further, the application 228 includes a calibrator 316 configured to determine calibration parameters defining the position and orientation of the sensors 208 and 216 relative to the above-mentioned location of the apparatus 103. The calibration parameters may be stored, for example, in the repository 232.

Figure 4:
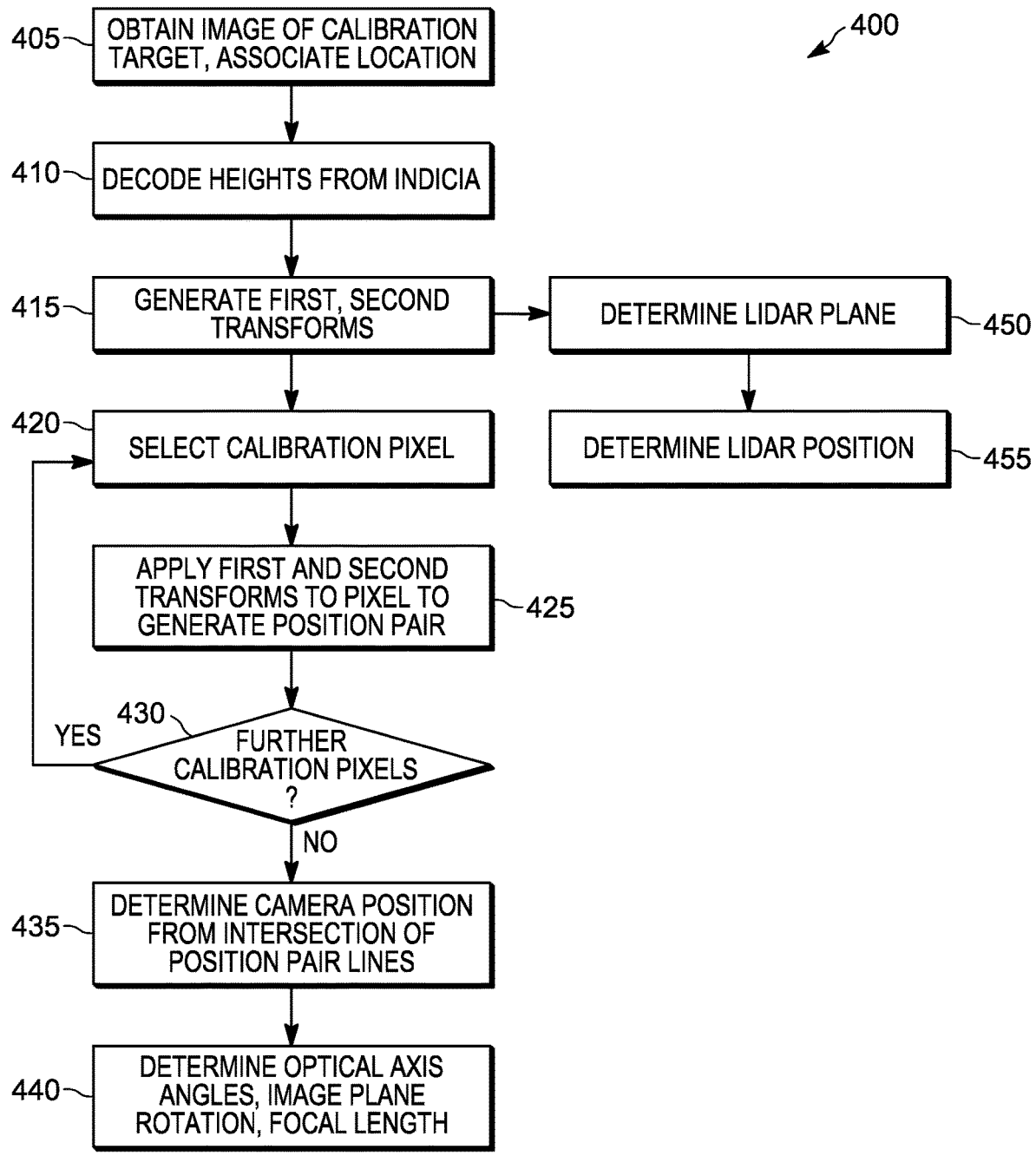
FIG. 4 is a flowchart of a sensor calibration method at the server of the system of FIG. 1.

The functionality of the control application 228 will now be described in greater detail, with reference to the components illustrated in FIG. 3. Turning to FIG. 4, a method 400 of determining calibration parameters for the sensors 208 and 216 is shown. The method 400 will be described in conjunction with its performance by the apparatus 103 as described above.

At block 405, the apparatus 103, and in particular the data capture controller 300, is configured to control one of the cameras 208 to capture an image of a calibration target. The data capture controller 300, for example, can transmit an instruction to a camera 208 (e.g. the camera 208-1) to capture an image, and simultaneously transmit an instruction to the corresponding illumination assembly 218 (e.g., the assembly 218-1) to illuminate the field of view of the camera 208. The image is associated with a location of the apparatus 103. In other words, simultaneously with the capture of the image, the navigator 304 is configured to determine the location of the apparatus 103 in the above-mentioned common frame of reference, for example in the form of a set of coordinates and a heading vector. The location may be embedded in the image (e.g. as metadata), or may be stored in the memory 222 in association with an identifier of the image. The method 400 can be initiated at block 405 in response to a variety of conditions. For example, in some embodiments a calibration target, to be discussed in greater detail below, is placed adjacent to the dock 108, and the mobile automation apparatus 103 is configured to perform block 405 upon engaging with the dock 108. In other embodiments, the mobile automation apparatus 103 is configured to initiate the performance of the method 400 according to a schedule stored in the memory 222 or received from the server 101. In further embodiments, the mobile automation apparatus 103 is configured to perform block 405 responsive to a one-time calibration instruction received from the server 101, the mobile device 105, or from an operator via an instrument panel (not shown) on the mobile automation apparatus 103 itself. In still further embodiments, the navigator 304 may initiate calibration responsive to detection of an impact, such as a collision with an object that may have shifted the position of the cameras 208 or lidar sensors 216.

As will be apparent in the discussion below, the performance of the method 400 relates to a single camera 208. However, the data capture controller 300 can be configured to initiate a plurality of instances of the method 400 substantially simultaneously. For example, the data capture controller 300 can be configured to instruct a plurality of the cameras 208 to capture respective images of the calibration target substantially simultaneously. In some embodiments, the illumination assemblies 218 of adjacent cameras 208 may interfere with the capture of images by the cameras 208. For example, referring briefly to FIG. 2A, the illumination assembly 218-1, which is configured to illuminate the field of view of the camera 208-1, may also partially illuminate the field of view of the camera 208-2. Such illumination of adjacent cameras 208 may be undesirable, for example by introducing artifacts into the captured images.

The data capture controller 300 can therefore be configured to control separate subsets of the cameras 208 and illumination assemblies 218 to capture images to reduce or eliminate such artifacts. More specifically, in the present example the data capture controller 300 is configured to control the cameras 208-1, 208-3, 208-5 and 208-7 (along with corresponding illumination assemblies 218-1, 218-3, 218-5 and 218-7) to simultaneously capture respective images. Following the capture of images by the first subset of cameras 208 as mentioned above, the data capture controller 300 is configured to control the remaining cameras and illumination assemblies (cameras 208-2, 208-4 and 208-6, and illumination assemblies 218-2, 218-4 and 218-6) to substantially simultaneously capture respective images. The cameras 208 and illumination assemblies 218 may be controlled in other suitable subsets dependent on the physical arrangement of the illumination assemblies 218 on the mast 204.

Returning to FIG. 4, whether one or many images are captured at block 405, the remainder of the method 400 is performed for a single image, and therefore a single camera 208. The other images, if additional images were captured, can be processed according to further performances of the method 400, either in parallel with the performance discussed below, or sequentially. As will be discussed in greater detail below, the data capture controller 300 can also be configured at block 405 to obtain a plurality of depth measurements via the lidar sensor 216 simultaneously with the capture of the image via the camera 208.

Before continuing with the discussion of the method 400, the calibration target mentioned above will be described in greater detail with reference to FIGS. 5A, 5B and 5C as well as FIGS. 6 and 7. Referring to FIG. 5A, the calibration target 500 includes a first surface 502 and a second surface 504. The first and second surfaces may be provided via any suitable object, such as paper, cardboard or the like mounted to a frame (not shown) supported on a base 508. The first surface 502 is at a first predefined depth, while the second surface is at a second predefined depth different from the first predefined depth.

As noted earlier, a common frame of reference is established in the retail environment, in the form of a three-dimensional coordinate system having an origin at a predetermined location within the retail environment. The origin of the common frame of reference is shown in FIG. 5A: the Z axis represents depth, the X axis is referred to herein as shift, and the Y axis is referred to herein as height. That is, referring to an object as being at a certain height indicates the position of the object along the Y axis. Further, referring to an object as having a certain height indicates a dimension of the object along the Y axis. A dimension of an object in the shift direction (i.e., the X axis) may also be referred to as a width.

The common frame of reference is shown in FIG. 5A as having its origin 512 at the base of the second surface 504, and midway along the width of the second surface 504. In other words, the calibration target 500 is placed at the above-mentioned predetermined location that defines the origin of the coordinate system established within the retail environment. The calibration target 500 is movable in some embodiments, and may therefore not always be at the location shown in FIG. 5A with respect to the origin 512. In examples in which the calibration target 500 is not located at the origin 512 as shown in FIG. 5A, the calibration target 500 establishes a local frame of reference based at the location of the origin 512 illustrated in FIG. 5A, and it is assumed that, prior to the performance of the method 400, the location of the calibration target 500 is known in the common frame of reference (i.e., that a known transform exists between the local frame of reference and the common frame of reference). For simplicity, it is assumed in the discussion below that the calibration target 500 is at the origin 512 (i.e., that the local frame of reference and the common frame of reference are the same).

The first and second surfaces 500 and 504 are parallel to the XY plane in the present example; that is, every point on the first surface 502 is at the same depth, and every point on the second surface 504 is at the same depth. The above-mentioned depths are separated by a known distance 516. For example, the first and second surfaces 500 and 504 may be separated by a distance of about 250 mm. The dimensions of each surface 502 in the shift and height dimensions are also known, and stored in the memory 222 along with the distance 516.

Each surface 502 and 504 bears a respective set of machine-readable indicia. Referring to FIG. 5B, the second surface 504 bears a first set of indicia 520-1 and a second set of indicia 520-2, extending height-wise along the second surface 504. The shift at which each set 520 is located is known, and for example stored in the memory 222. As seen in FIG. 5B, in the present example, the sets 520 are disposed on the second surface 504 symmetrically about the height or Y axis. The first surface 502, turning to FIG. 5C, bears a further set 524 of indicia, which in the present example covers substantially the entirety of the first surface 502. The nature of the indicia will be discussed in further detail below, with reference to a region 528 of the second surface 504, depicted in FIG. 6 and a region 532 of the first surface 502, depicted in FIG. 7.

Turning to FIG. 6, the region 528 of the second surface 504 is illustrated in greater detail. In particular, the first and second sets of indicia 520-1 and 520-2 are shown to each include a plurality of vertically arranged (that is, arranged in the height direction, parallel to the Y axis shown in FIGS. 5A-5C) indicia. In the present example, the indicia of the sets 520-1 and 520-2 are identical. Each indicium includes a lower boundary line 600, a pair of side boundary lines 604-1 and 604-2 extending perpendicularly from the ends of the lower boundary line 600, and a height code 608 between the side boundary lines 604. The height code encodes, in a suitable machine-readable format, the height of the lower boundary line 600. In the present example, the height codes 608 are graphical representations of 8-bit binary codes, in which a black bar represents the value 1, and a white bar represents the value 0. Each binary code encodes the height of a corresponding lower boundary line 600 in centimeters. Thus, for example, the height code 608 labelled in FIG. 6 indicates that the boundary line 600 is at a height of 1 cm. As will therefore be apparent, the height of each side boundary line 604 is predefined as 1 cm in the present example. Further, both the shift position and the width of the lower boundary lines 600 are also predefined. For example, in the calibration target shown in FIGS. 5A-5C and 6, the lower boundary lines 600 each have a width of 26 mm. The end of each boundary line 600 closest to the Y axis is at a shift (i.e., a position along the X axis shown in FIGS. 5A-5C) of +/−50 mm. The predefined dimensions and positions of the indicia 520 are stored in the memory 222, for example in the repository 232 for later use in the calibration process.

In some examples, as shown in FIG. 6, the second surface 504 also includes first and second auxiliary sets of indicia 612-1 and 612-2 disposed at greater shifts than the sets 520-1 and 520-2. The auxiliary sets of indicia 612-1 and 612-2 include a plurality of dots 616 at predefined intervals in the shift and height directions. As seen in FIG. 6, each dot 616 is also aligned with a boundary line 600, and thus each height code 608 also encodes the height of a subset of the dots 616.

Figure 7:
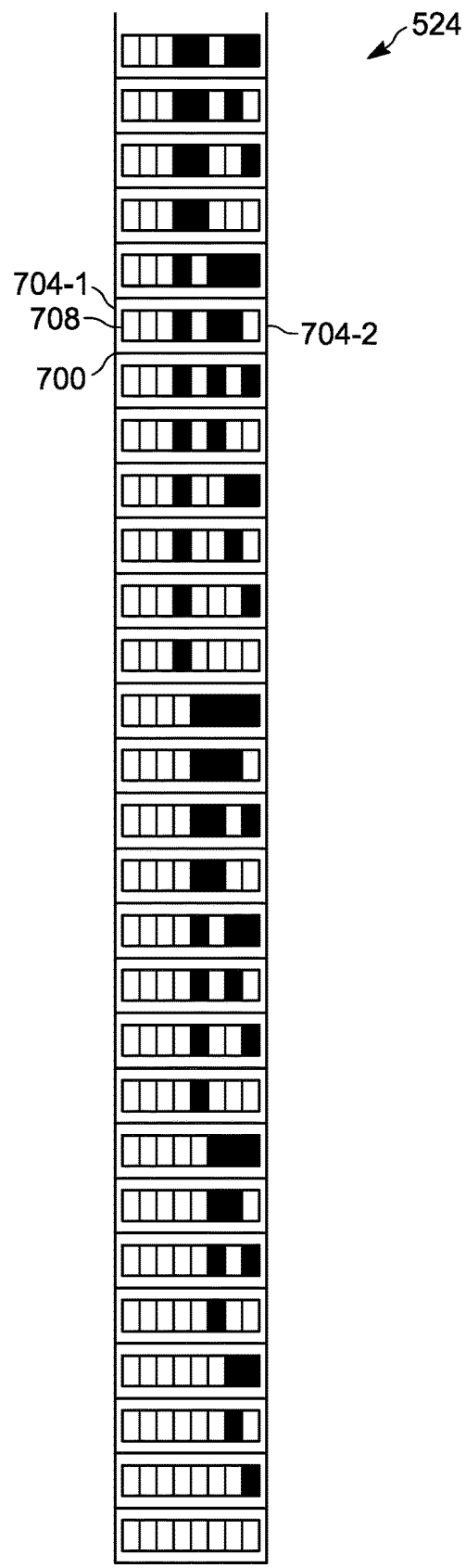
FIG. 7 is a detailed view of a portion of a first surface of the calibration target of FIG. 5.

Turning to FIG. 7, the set of indicia 524 depicted on the first surface 502 is shown. As will now be apparent, the set of indicia 524 is identical to each of the sets 520-1 and 520-2. Thus, the set of indicia 524 includes a vertically arranged plurality of indicia, each including a lower boundary line 700 (having a width of 25 mm in the present example) and a pair of side boundary lines 704-1 and 704-2 (having heights of 1 cm in the present example). Each indicium in the set 524 also includes a height code 708, in the form of an 8-bit binary code encoding a height in centimeters. Thus, the indicium labelled in FIG. 7 indicates that the boundary line 700 is at a height of 22 cm.

In summary, therefore, the surfaces 500 and 504 themselves of the calibration target 500 have predefined (and thus known to the apparatus 103, via storage in the memory 222) depths in the common frame of reference. Further, each surface carries indicia with predefined widths and at predefined shifts. The indicia encode the heights at which they are located in the common frame of reference; as will be seen below, such encoding permits the apparatus 103 to assign heights to pixels of captured images, and the predefined data mentioned earlier permits the apparatus 103 to assign shifts and depths to those pixels.

Prior to the performance of the method 400, the apparatus 103 and the calibration target 500 are oriented relative to one another such that the first surface 502 is closer to the cameras 208 than the second surface 504. Further, the calibration target is preferably placed such that all three sets of indicia 520-1, 520-2 and 524 are within the field of view of the camera 208 to be calibrated, and that the set of indicia 524 on the first surface 502 is visible in the field of view between the sets 520-1 and 520-2 on the second surface 504. In some examples, to ensure that the cameras 208 successfully focus on the calibration target 500, the calibration target 500 may be placed at a predetermined distance from the apparatus 103. Neither the orientation of the calibration target 500 nor the distance from the calibration target to the apparatus 103 need be precisely known, however.

Returning to FIG. 4, responsive to the capture of an image at block 405, the decoder 308 is configured to obtain the captured image and to decode the above-mentioned indicia at block 410 to obtain the height (in the common frame of reference) of each indicium. The decoder 308 is configured to identify indicia in the image by the application of a suitable blob detection operation, or combination of blob detection operations, to detect areas of the image having different properties (e.g. color, intensity, and the like) from surrounding areas of the image. Examples of such operations include the maximally stable extremal regions (MSER) technique. Having applied the blob detection operation to the image to identify indicia, the detector 308 is configured to classify the indicia (i.e. any detected blobs in the image) into one of the sets 520-1, 520-2, 524, 612-1 and 612-2. In an embodiment, the classification of indicia is based on any suitable combination of shape, size, aspect ratio and the like. For example, any circular blob is classified as a dot 616. Meanwhile, any rectangular blob is classified as a height code, and the height codes 608 are distinguished from the height codes 708 by size. More specifically, the height codes 708, being closer to the camera 208, appear larger in the image than the height codes 608. The sets 520-1, 520-2 and 524 may be detected as unitary blobs, which are then subdivided by further blob detection operations into height codes, lower boundary lines and side boundary lines. In other examples, the lower boundary lines, side boundary lines and height codes are detected without first detecting the sets 520, 524 as unitary blobs.

The detector 308 can be configured, when the calibration target 500 includes the auxiliary sets 612 of indicia, to detect the dots 616 and prior to detecting and classifying any remaining blobs in the captured image, to extract a portion of the image bounded by the dots 616. For example, turning to FIG. 8, an image 800 captured at block 405 is shown, including depictions 820-1, 820-2 and 824 of the sets of indicia 520-1, 520-2 and 524, respectively. The image 800 also includes depictions 816-1 and 816-2 of the auxiliary sets 612-1 and 612-2, respectively (the dots 616 themselves are not shown in FIG. 8 for clarity of illustration). The detector 308 is configured to detect the dots 616 and to extract a portion 808 of the image 800 for further processing, discarding the remainder of the image 800.

Figure 8:
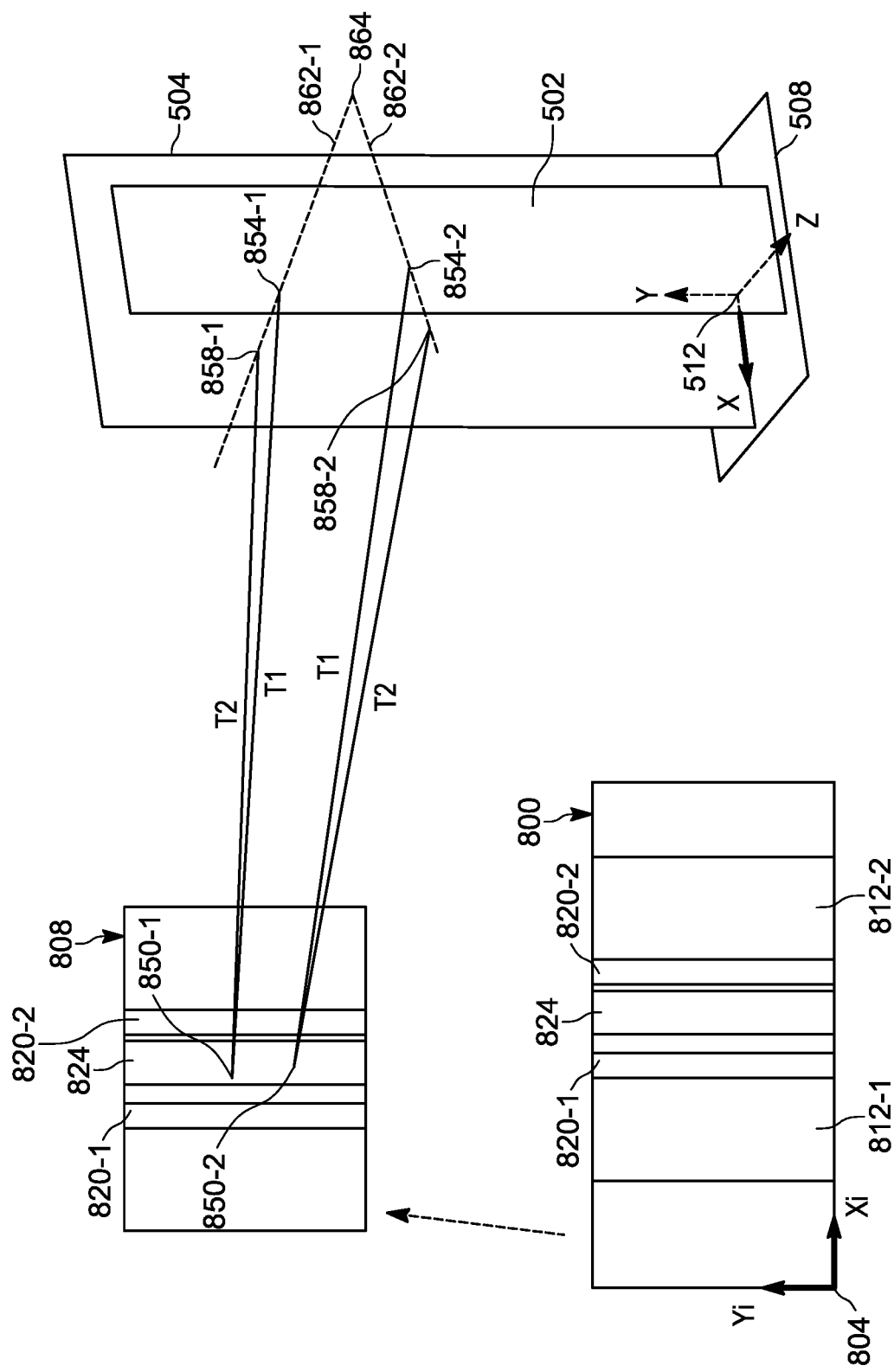
FIG. 8 illustrates the performance of blocks 420-435 of the method of FIG. 4.

The image 800 (and therefore also the extracted portion 808) has an image frame of reference with an origin 804 and two orthogonal dimensions indicated as "Yi" and "Xi" in FIG. 8. Any pixel in the image 800 has a position in the image frame of reference, typically expressed as a number of pixels along each of the axes Yi and Xi. Having identified and classified blobs in the image 800 into the sets 520-1, 520-2 and 524 of indicia, the detector 308 is configured to assign coordinates in the common frame of reference to at least a subset of the pixels in the image 800. The subset may also be referred to as reference points. In the present example, the reference points include each intersection between a lower boundary line 600 or 700 and a side boundary line 604 or 704. The reference points may also include the center of each dot 616.

Coordinates in the common frame of reference are assigned to each of the subset of pixels based on (i) the heights decoded from the codes 608 and 708, (ii) the predefined shifts and widths of the boundary lines 600, 700, 604 and 704, and (iii) the predefined depths of the surfaces 500 and 504. Thus, the detector 308 is configured to generate a list of reference points each having a position defined in the (two-dimensional) image frame of reference, also referred to as an image position, and a position defined in the (three-dimensional) common frame of reference.

Referring again to FIG. 4, at block 415 the transform generator 312 is configured to generate a first transform between the image frame of reference and a first plane in the common frame of reference. The transform generator 312 is also configured to generate a second transform between the image frame of reference and a second plane in the common frame of reference. The first plane coincides with the position of the first surface 502 in the common frame of reference, while the second plane coincides with the position of the second surface 504 in the common frame of reference. Each transform is generated via a comparison of the image positions and the common frame of reference positions of the above-mentioned reference points. Any suitable transform-generation operation, or combination thereof, may be applied at block 415 to generate the transforms. Examples of such operations include the random sample consensus (RANSAC) algorithm, which is deployed in some examples to generate the transform following the selection of reference points and the determination of the common frame of reference positions of the reference points. In general, each transform specifies a fixed depth (corresponding to the depth of the respective plane, which is the same as the depth of the corresponding one of the surfaces 500 and 504), and also specifies coefficients which, when applied to the Xi and Yi coordinates of an image position, transform the Xi and Yi coordinates into X and Y (i.e. shift and height) coordinates of a point in the common frame of reference that is depicted by the pixel at the image position. The transforms generated at block 415 are stored, for example in the repository 232.

At block 420, the calibrator 316 is configured to select a calibration pixel from the image 800 (or from the portion 808 of the image 800, when the above-mentioned extraction of the portion 808 is implemented). The calibration pixel is typically one of the previously mentioned reference points.

At block 425, the calibrator 316 is configured to generate a position pair in the common frame of reference for the selected calibration pixel. The position pair includes a first calibration position corresponding to the pixel on the first plane mentioned above, and a second calibration position corresponding to the pixel on the second plane. The first and second calibration positions are generated by applying the first and second transforms, respectively, to the image position of the selected calibration pixel.

Returning to FIG. 8, a first calibration pixel 850-1 is indicated in the image portion 808. The pixel 850-1 has a position in the image frame of reference. Applying the first transform, indicated as "T1" in FIG. 8, generates a first calibration position 854-1 corresponding to the pixel 850-1 in the common frame of reference. More specifically, the first calibration position is the position on the first surface 502 that is depicted by the pixel 850-1. In addition, the second transform, indicated as "T2", is applied to the pixel 850-1 to generate a second calibration position 858-1 in the common frame of reference. The second calibration position 858-1 lies on the second surface 504, and is not visible in the image portion 808. However, were the first surface 502 transparent or absent, the second calibration position 858-1 would be depicted at the pixel 850-1.

In other words, the first and second calibration positions 854-1 and 858-1, as a result of having been generated from a single calibration pixel 850-1, both lie on a line travelling to the camera 208. Referring again to FIG. 4, at block 430 the calibrator 316 is configured to determine whether to select further calibration pixels. The calibrator 316 can store a preconfigured number of calibration pixels to select, and can therefore assess at block 430 whether the preconfigured number of calibration pixels has been reached. When the preconfigured number of calibration pixels has not been reached (i.e., Yes in block 430), a further calibration pixel is selected and a further position pair is generated. FIG. 8 illustrates a second calibration pixel 850-2, and a second position pair generated from the second calibration pixel 850-2, including a first calibration position 854-2 and a second calibration position 858-2. The calibrator 316 is configured to perform blocks 420 and 425 at least twice. In some examples, the calibrator 316 is configured to perform blocks 420 and 425 about twenty times. In other examples, however, blocks 420 and 425 may be performed more than twenty times, or between two and twenty times.

When the determination at block 430 is negative, the calibrator 316 is configured to perform block 435. At block 435, the calibrator 316 is configured to determine and store a camera position in the common frame of reference from an intersection of calibration lines defined by the above-mentioned position pairs. In particular, the calibrator 316 is configured to determine the position of the nodal point (i.e. the focal point) of the camera 208 in the common frame of reference. Returning to FIG. 8, the calibrator 316 is configured to generate a calibration line 862-1 corresponding to the position pair 854-1 and 858-1, and a calibration line 862-2 corresponding to the position pair 854-2 and 858-2. As will be understood by those skilled in the art, the calibration lines 862 are representative of rays of light extending toward the nodal point of the camera 208. Therefore, the intersection of the calibration lines 862 defines position of the nodal point 864.

Proceeding to block 440, the calibrator 316 is configured to determine and store additional calibration parameters to characterize the position and orientation of the camera 208 relative to the location of the apparatus 103 in the common frame of reference. In particular, the calibrator 316 is configured to generate at least one of, and in the present example all of, an angle of image plane rotation, an optical axis orientation, a distance between an image sensor of the camera 208 and the nodal point, and a focal length. Additional parameters may also be determined at block 440, such as the vertices of the intersection (which is typically a quadrilateral) of the camera field of view with the second surface 504.

Referring to FIG. 9, the angle of image plane rotation reflects the degree of rotation of the image frame of reference within the XY plane of the common frame of reference. The image plane rotation, in other words, is a rotation about the optical axis of the camera 208, and may also be considered a "roll" angle (in contrast to a "pitch" angle reflecting the orientation of the camera 208 in the YZ plane, or a "yaw" angle reflecting the orientation of the camera 208 in the XZ plane). The angle of image plane rotation is determined by the calibrator 316 by locating the center of the image 800. For example, the center 900 of the image 800 is illustrated as the intersection of diagonal lines connecting opposite corners of the image 800. The calibrator 316 is then configured to select at least one other pixel along a line 904 dividing the image 800 into equally-sized upper and lower halves, and by applying one of the transforms T1 and T2 (as illustrated in FIG. 9, T1 is applied), to determine the position 908 of the line 904 in the common frame of reference. The angle of image plane rotation 912 is the angle between the line 908 and a line parallel to the X, or shift, axis (indicated as X' in FIG. 9). In other examples, the above determination of image plane rotation can be performed by applying the transform T2 to the corners of the image 800. The corners, when transformed to points on the second surface 504, define a quadrilateral representing the intersection between the camera 208 field of view and the second surface 504. The center of the above-mentioned quadrilateral can then be identified (e.g as the intersection of diagonals extending between the corners) and employed for the determination of image plane rotation, rather than the center of the image 800 itself.

The calibrator 316 is further configured to determine optical axis orientation by applying one of the transforms T1 and T2 (as illustrated in FIG. 9, T2 is illustrated) to the center 900 of the image 800 to determine a position 914 in the common frame of reference that corresponds to the center 900. The calibrator 316 is then configured to project a vector 916 from the center 914 to the nodal point 864, and to determine a pair of angles defining the orientation of the vector 916: an angle in the YZ plane (referred to above as a pitch angle) and an angle in the XZ plane (referred to above as a yaw angle).

The calibrator 316 is configured to determine a distance 920 between the nodal point 864 and the image sensor 924, for example, by determining a field of view angle at the nodal point 864. The field of view angle is the angle between lines extending from the nodal point 864 to points corresponding to pixels on opposite edges of the image 800. The field of view angle may be determined, for example, by determining the length of the above-mentioned lines and the distance between the points corresponding to pixels on opposite edges of the image 800. Based on the above-mentioned angle and the known (e.g., stored in the memory 222) dimensions of the sensor 924, the distance 920 can be determined. The distance 920 and the optical axis angles mentioned above may be expressed as an image sensor normal vector, which may be stored in the memory 222.

The calibrator 316 is configured to determine a focal length of the camera 208 based on the distance 920 and the distance 916, as well as on a magnification factor. The magnification factor is defined by the ratio of sizes between an object depicted in the image 800 (such as an indicia of known dimensions) and the depiction of that object on the surface of the sensor 924. Having determined the magnification factor, the calibrator 316 is configured to determine the focal length, for example by employing the thin lens equation, which relates focal length to magnification factor, object distance and image distance. The sum of the object distance (distance between the objective lens of the camera 208, whose position in the common frame of reference is not known, and an object depicted in the image 800) and the image distance (distance between the objective lens and the sensor 924) is the sum of the distances 916 and 920. Further, the image distance is the product of the image distance and the magnification factor. Thus, the calibrator can determine the object and image distances and therefore the focal length.

The normal vector, image plane angle, and focal length are stored in the memory 222 in association with the location of the apparatus 103. In some examples, a calibration transform is generated by the calibrator 316 to convert a vector representing a current location of the apparatus 103 (including the heading of the apparatus 103) into a current normal vector indicating the position and orientation of the camera 208 field of view in the common frame of reference. Such a transform may be employed to map subsequent images, captured by the camera 208 at subsequent locations of the apparatus 103, to the common frame of reference.

Returning to FIG. 4, the calibrator 316 can also be configured to generate calibration parameters for a lidar sensor 216, instead of or in addition to generating the camera calibration parameters discussed above. Specifically, after generation of the first and second transforms, the calibrator 316 is configured to determine a characterization of a lidar light plane. To that end, at block 405, as mentioned earlier, the data capture controller 300 is configured to control one of the lidar sensors 216 simultaneously with the camera(s) to capture a set of depth measurements during the capture of an image. As will be appreciated by those skilled in the art, the lidar sensor 216 captures depth measurements by sweeping a line of light (e.g. laser light) through a plurality of sweep angles. At each sweep angle, a set of depth measurements are collected along the length of the line. In the present example, the lidar sensor 216 is controlled to capture one line of measurements (i.e., a one-dimensional array of depth measurements corresponding to a single sweep angle) during the capture of an image by the camera 208.

Figure 10A:
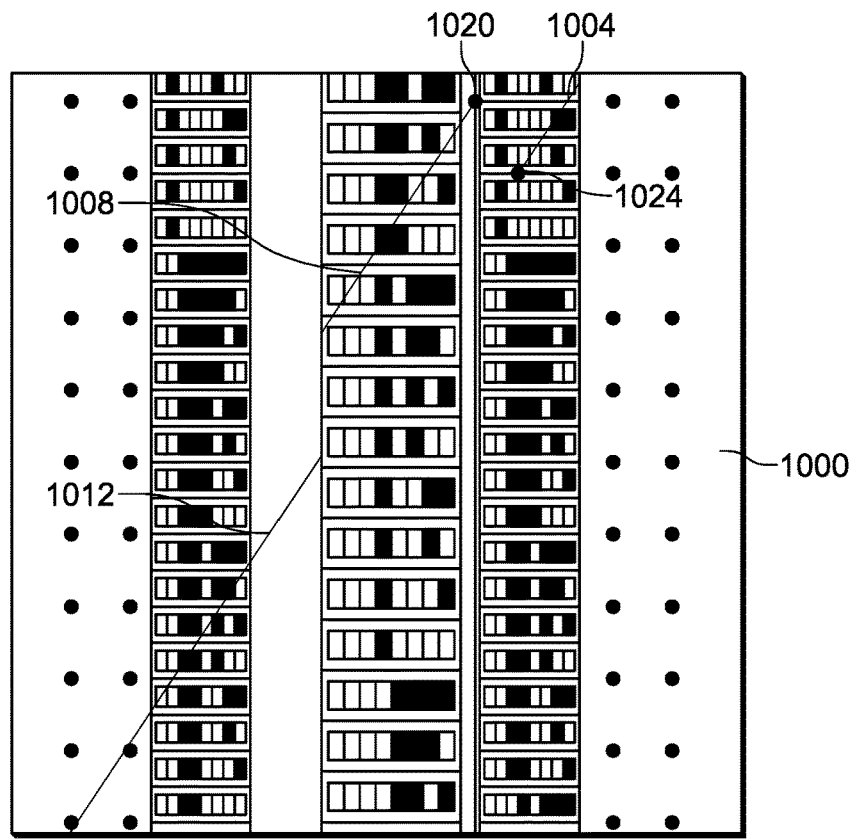
FIGS. 10A-10B illustrate the performance of block 450 of the method of FIG. 4.
Figure 10B:
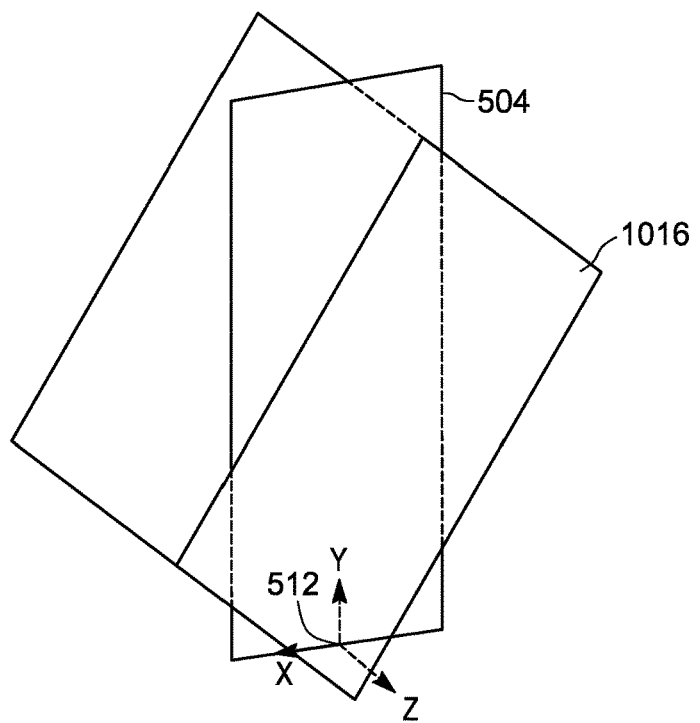

As a result of the synchronized capture of image data and depth measurements at block 405, as shown in FIG. 10A, the above-mentioned line of lidar light is depicted in the image captured at block 405 as a plurality of line segments 1004, 1008, 1012. The decoder can be configured, during the performance of block 410, to identify the line segments in addition to the indicia 520, 524 and 612. At block 450, the calibrator 316 is configured to determine a characterization of the plane in which the above-mentioned line of lidar light is projected by selecting pairs of pixels from the image 1000, a first pair lying on the segment 1008, and a second pair lying on one of the segments 1004 and 1012. By applying the first transform T1 to the pair of pixels from the segment 1008 and the second transform T2 to the pair of pixels from the segment 1004 or 1012, the calibrator 316 is configured to generate first and second vectors in the common frame of reference from the pairs of pixels. The vectors are non-collinear (being at different depths), and may therefore be employed to determine a normal vector defining the orientation of the lidar plane (e.g. by computing the cross product of the vectors). The calibrator 316 is then configured to determine a distance parameter defining the distance between the plane and the origin 512. The vector and the distance parameter together define the position and orientation of the lidar plane (for the sweep angle employed at block 405) in the common frame of reference. FIG. 10B illustrates the lidar plane 1016 in the common frame of reference.

Figure 11A:
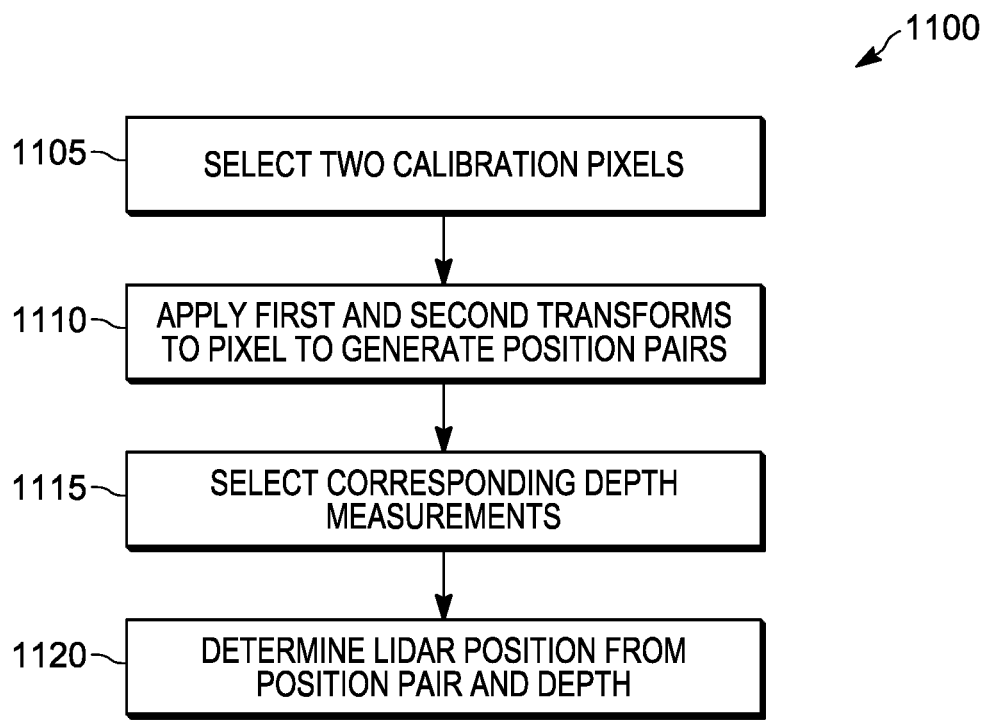
FIG. 11A is a flowchart of a method for performing block 455 of the method of FIG. 4.

At block 455, the calibrator 316 is configured to determine and store the position of the lidar sensor 216 in the common frame of reference. Referring to FIG. 11A, in some embodiments the calibrator 316 is configured to perform block 455 according to a method 1100. At block 1105, the calibrator 316 is configured to select a pair of calibration pixels from the image 1000. Returning to FIG. 10, the calibrator is configured to identify the pixels 1020 and 1024 as adjacent ends of the segments 1004 and 1008, which are taken to approximately represent two points on a single ray of light emitted by the lidar sensor 216. The calibrator 316 is configured to generate a calibration line from the common frame of reference positions (obtained at block 1110 via the application of the transform T1 to the pixel 1020 and the transform T2 to the pixel 1024) of the pixels 1020 and 1024. As will now be apparent, a second line may not be available, and the calibrator 316 is therefore configured to identify the position of the lidar sensor 216 along the above-mentioned single line based on the depth measurement obtained by the sensor 216 that corresponds to one of the pixels 1020 and 1024. For example, the calibrator 316 may be configured at block 1115 to identify a discrete step in the depth measurements, indicative of the transition between the pixel 1024 and 1020. Based on one of the depth measurements defining the discrete step, the calibrator is configured to determine the position of the lidar sensor 216 at block 1120.

Figure 11B:
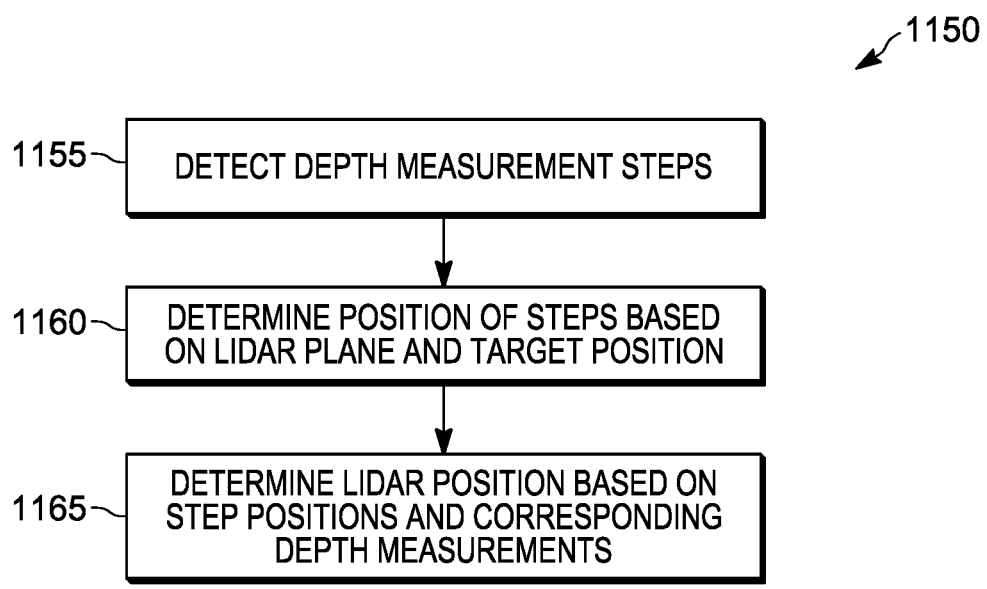
FIG. 11B is a flowchart of a method for performing block 455 of the method of FIG. 4, according to another embodiment.

In other embodiments, the calibrator 316 is configured to perform block 455 according to a method 1150 as shown in FIG. 11B. At block 1155, the calibrator is configured to identify discrete steps in the depth measurements that correspond to the edges of the calibration target 500 (e.g. the edges of the second surface 504). For example, the calibrator 316 can be configured to identify a pair of transitions in the depth measurements at which the measured depth exceeds a threshold. In other examples, the calibrator 316 can be configured to identify two pairs of transitions, one of which corresponds to the edges of the first surface 502 and the other of which corresponds to the edges of the second surface 504. The outer pair of steps are selected as corresponding to the edges of the second surface 504.

Figure 12:
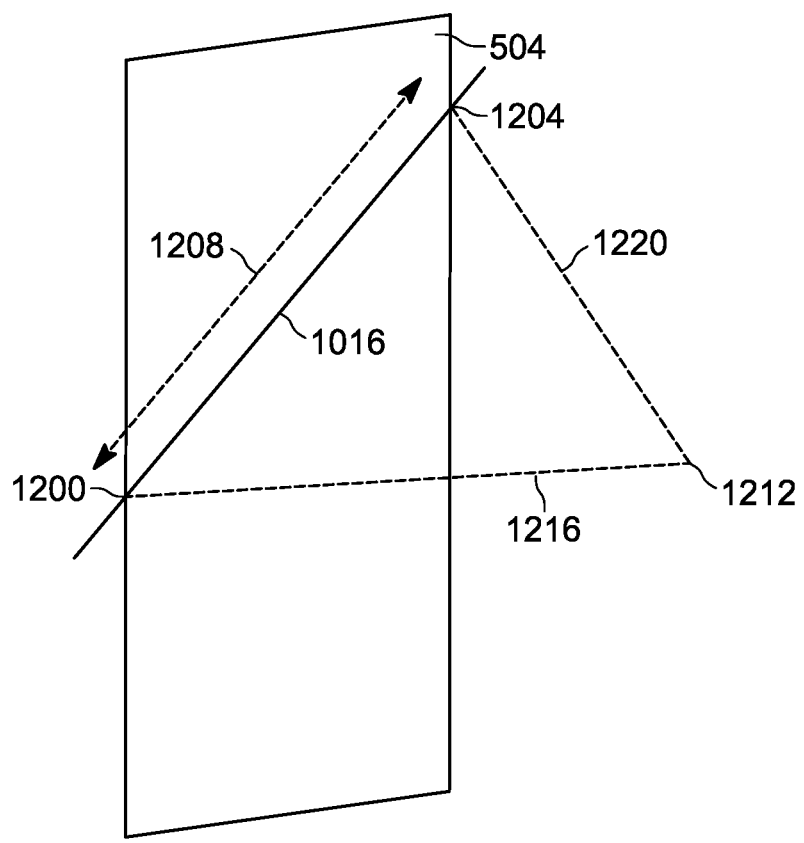
FIG. 12 illustrates the performance of the method of FIG. 11B.

Having detected the steps in the depth measurements, at block 1160 the calibrator 316 is configured to determine the positions of the steps in the common frame of reference. Referring to FIG. 12, the position of the steps is determined based on the intersection of the plane 1016 with the surface 504 (the positions and orientations of both of which are known in the common frame of reference). As a result, at block 1160 the calibrator 316 determines the positions of the points 1200 and 1204, as well as the distance 1208 between the points 1200 and 1204.

At block 1160, the calibrator 316 is configured to determine a position 1212 of the lidar sensor 216 based on the distance 1208 and the positions of the points 1200 and 1204, as well as the depth measurements 1216 and 1220 corresponding to the points 1200 and 1204, respectively. Following completion of block 455 (via the method 1100 or the method 1150), the calibration parameters for the lidar sensor 216 (the position 1212 and the plane 1016) are stored in the memory 222 in association with the location of the apparatus 103 at which the depth measurements were captured. The calibration parameters may be employed to map subsequent depth measurements to the common frame of reference based on the location of the apparatus 103 at the time such measurements are captured.

Variations to the above systems and methods are contemplated. For example, the server 101 may be provided with image data and depth measurements, as well as the associated location of the apparatus 103, and may derive the calibration parameters and provide the parameters to the apparatus 103. In other words, the server 101 may implement the functionality of one or more of the decoder 308, the transform generator 312 and the calibrator 316.

In some embodiments, the calibration target 500 can include additional sets of indicia beyond those discussed above. Further, the calibration target 500 can include different sets of indicia on the first surface 500 than on the second surface 504. Still further, the height codes discussed above may be replaced or supplemented with shift codes in some examples.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A sensor calibration target surface assembly configured for sensor calibration relative to a common frame of reference, the sensor calibration target surface assembly comprising:

a first surface disposed at a first predefined depth respective to the common frame of reference, the first surface bearing a first set of indicia at respective first heights and having respective first predefined shifts, wherein each of the first heights and first predefined shifts are respective to the common frame of reference, and each of the first indicia encoding a corresponding first height; and a second surface disposed at a second predefined depth respective to the common frame of reference, the second surface bearing a second set of indicia and a third set of indicia, wherein the first set of indicia, the second set of indicia and the third set of indicia are identical, each indicia within the second set of indicia and the third set of indicia disposed at the respective first height and having a respective second predefined shift, wherein each indicia within the second set of indicia and the third set of indicia encoding the corresponding first height, each of the respective first height and the respective second predefined shifts are respective to the common frame of reference, wherein the common frame of reference includes orthogonal depth, height, and shift dimensions.

2. The sensor calibration target surface assembly of claim 1 wherein the sensor calibration target is associated with a predetermined location in the common frame of reference.

3. The sensor calibration target surface assembly of claim 2 wherein the predetermined location is an origin of the common frame of reference.

4. The sensor calibration target surface assembly of claim 1 wherein the second surface includes at least one set of auxiliary indicia comprising a plurality of dots.

5. The sensor calibration target surface assembly of claim 4 wherein each of the plurality of dots is disposed at predefined intervals in the shift and height dimensions.

6. The sensor calibration target surface assembly of claim 4 wherein each of the plurality of dots is aligned with a boundary line on the second surface, the boundary line corresponding to the corresponding second height encoded by each of the second indicia.

7. The sensor calibration target surface assembly of claim 1 wherein the first surface and the second surface includes a respective boundary line disposed at the corresponding first height and the corresponding second height.

8. The sensor calibration target surface assembly of claim 1 wherein the sensor calibration target is associated with a location of a mobile automation apparatus in the common frame of reference.

9. The sensor calibration target surface assembly of claim 8 wherein the mobile automation apparatus includes at least one of an image sensor and a lidar sensor.

* * * * *